A

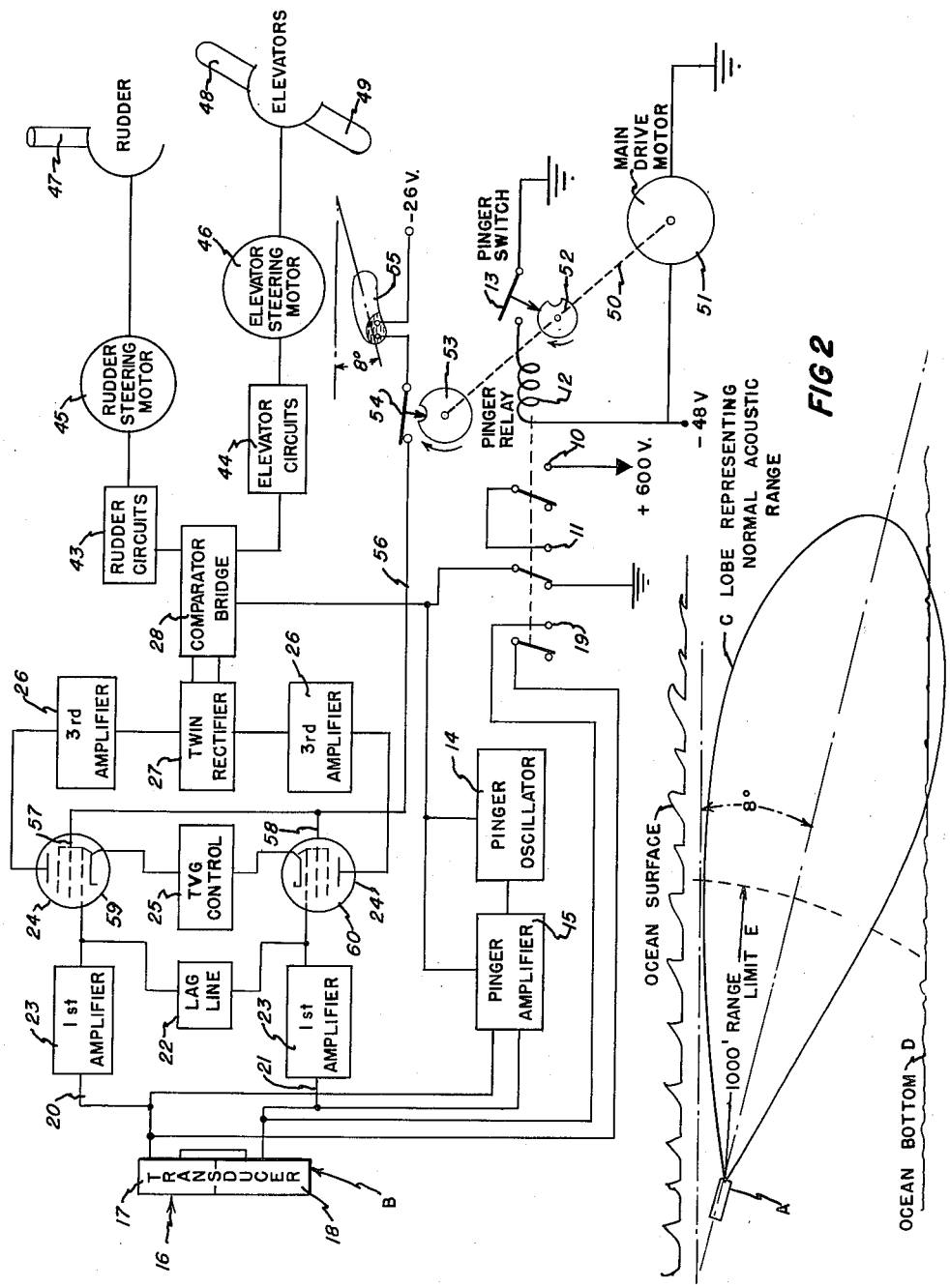

United States Patent Office 3,021,806
Patented Feb. 20, 1962

3,021,806
RANGE BLANK FOR ECHO-CONTROLLED TORPEDO
Paul C. Gardiner, Scotia, N.Y., assignor, by mesne assignments, to the United States of America as represented by the Secretary of the Navy
Filed Oct. 4, 1950, Ser. No. 188,471
6 Claims. (Cl. 114—23)

The invention relates to improvements in echo-controlled torpedoes, and more specifically to range control circuits for echo-controlled steering systems.

When an echo-controlled torpedo pitches downwardly, for instance during pursuit of a lower target, false control may be caused by direct reflections from the ocean bottom even though a fairly deep layer of water lies beneath the target.

An important object of the present invention is to provide means avoiding false control by ocean bottom reflections during downward echo-controlled attacks.

Another object is the provision of an improved range reducing circuit for an echo-controlled torpedo.

A further object is to provide an improved range reducing circuit operable only when the downward pitch of the echo-controlled torpedo exceeds a predetermined angle.

Other objects and advantages of the invention will become apparent during the course of the following detailed description, taken in connection with the accompanying drawing, forming a part of this specification, and in which drawing:

FIG. 1 is a diagrammatic view of the improved echo-controlled steering system;

FIG. 2 is a diagrammatic view illustrating the operation of a downwardly pitched echo-controlled torpedo equipped with the improved range reducing system.

The letter A in FIG. 2 designates a torpedo equipped with the echo-controlled steering system B shown in FIG. 1. Under the control of series contacts 10, 11 of a pinger relay 12 energized upon closing of a pinger switch 13, pulses or pings of 60-kc. voltage and 30-milliseconds duration are generated and amplified by a pinger oscillator 14 and amplifier 15. These pulses or pings are projected underwater every 0.8 second by a transducer 16 whose vertically spaced sections 17, 18 are connected in parallel during transmission by a contact 19 of the pinger relay 12. The supersonic waves leave the transducer and, if there is a target present within range, are reflected back as echoes. Upon reaching the transducer, these echoes are translated into electrical input signals in dual amplifier channels 20, 21, the two parts of the transducer acting independently during reception.

If an echo returns from a target below the axis of the torpedo, the wave front will strike the lower half of the transducer first and the signal voltage generated in the lower half will lead in phase that generated in the upper half. Likewise, if the echoes are from a target above the axis of the torpedo, the signal voltage in the upper half will lead that in the lower half. This phase difference is converted into an amplitude difference by a lag line 22 following the first stage 23 of dual amplification. At the second amplified stage 24, the overall sensitivity of the receiver is gradually increased during each reception interval by a time-variation-of-gain (TVG) control 25. This TVG control prevents false tripping of the steering control circuits on reverberation immediately following the ping and also prevents amplifier overloading on strong echo signals at close range.

The processed signals from both channels 20, 21, after a third amplifier stage 26, are rectified by a twin diode 27 and applied to a comparator bridge 28 which acts as interpreter and disseminator of information and is adapted to control rudder and elevator circuits 43, 44 including motors 45, 46 for setting the rudder 47 and elevators 48, 49 respectively.

Fixed on a shaft 50 turned at a reduced speed by the main drive motor 51 of the torpedo is a pinger cam 52 controlling periodic closing of the pinger switch 13. Also fixed on the same shaft 50 is a range reducing cam 53 adapted to cause intermittent closing of a range reducing switch 54 serially connected with a pitch-controlled mercury switch 55 in a receiver blanking circuit 56 adapted, when closed, to apply —26 volts to the screen grids 57, 58 of the second stage amplifier pentodes 59, 60, thereby cutting off these tubes and blanking the receiver.

The pinger and range cams 52, 53 are so positioned on the camshaft 50 that the range reducing switch 54 is closed upon the expiration of a time period following pinger switch operation, this time period equalling the transit time required for the projection of a supersonic wave and the return of its echo to the transducer from a target at 1000 foot range. The mercury switch 55 is mounted on the torpedo and is gravity operated so as to close when the torpedo pitches forwardly and downwardly at least 8 degree from the horizontal.

From an inspection of FIG. 2 it will be seen that, upon downward pitching of the torpedo A, the lobe C representing the normal acoustic range of the torpedo may extend to the ocean bottom D so as to affect the control of the torpedo. From the foregoing description, however, it is clear that the receiver is blanked for all ranges beyond 1000 feet provided the mercury switch is closed. Thus the 1000 foot range limit E shown in FIG. 2 reduces the effective extent of the lobe C so as to prevent control by echoes that are reflected from the ocean bottom.

Various changes may be made in the form of invention herein shown and described without departing from the spirit of the invention or the scope of the following claims.

What is claimed is:

1. In an echo signaling system of the character described, a transmitter for projecting wave energy, control means adapted to effect operation of said transmitter during spaced transmission periods separated by listening intervals, a receiver adapted to translate echoes of said projected wave energy, upon reception, into electrical signals, means for blanking operation of said receiver upon the expiration of a time length following each transmission period so as to limit the effective range of the system, said receiver blanking means being disabled during substantially horizontal disposition of said transmitter, and means enabling said receiver blanking means responsive to pitching of said transmitter beyond a predetermined angle.

2. In an echo controlled system for steering a torpedo toward a target, a transmitter for projecting acoustic waves ahead of the torpedo, control means adapted to effect operation of said transmitter during spaced transmission periods separated by listening intervals, a receiver adapted to translate echoes of said projected acoustic waves, upon return from said target, into steering control signals, means for blanking operation of said receiver upon the expiration of a time length following each transmission period so as to limit the effective range of the system, said receiver blanking means being disabled during substantially horizontal disposition of said torpedo, and means enabling said receiver blanking means responsive to pitching of the torpedo beyond a predetermined angle.

3. In an echo controlled torpedo equipped with steering gear, a transmitter adapted upon energization to project acoustic signals, control means adapted to energize said transmitter during regularly spaced transmission times separated by listening intervals, a receiver adapted to translate echoes of said acoustic signals, upon reception, into electrical signals for controlling said steering gear, and a range controlling circuit adapted on energization to control the operation of said receiver, said circuit including a range control switch synchronized with said transmitter control means so as to close only upon the expiration of a predetermined fraction of each of said listening intervals, and a pitch controlled switch adapted to close only responsive to pitching of the torpedo beyond a predetermined angle, said range control switch and said pitch controlled switch being serially connected in said range controlling circuit whereby the range of the echo control system is controlled upon excessive pitching of the torpedo.

4. In an echo controlled torpedo equipped with steering gear, a transmitter adapted upon energization to project acoustic signals underwater, control means adapted to energize said transmitter during regularly spaced transmission times separated by listening intervals, a receiver adapted to translate echoes of said acoustic signals, upon reception, into electrical signals for controlling said steering gear, said receiver having at least one vacuum tube amplifier including a cathode, an anode and at least one control electrode, and a range reducing circuit adapted, upon closing, to impress voltage on one of the electrodes of said amplifier so as to disable said receiver, said circuit including a range reducing switch synchronized with said transmitter control means so as to close only upon the expiration of a predetermined fraction of each of said listening intervals, and a pitch controlled switch serially connected in said circuit with said range reducing switch, said pitch controlled switch being adapted to close only responsive to pitching of the torpedo beyond a predetermined angle whereby the range of the echo control system is reduced upon excessive pitching of the torpedo.

5. In an echo controlled torpedo equipped with steering gear, a transmitter adapted upon energization to project acoustic signals underwater, a receiver adapted to translate echoes of said acoustic signals, upon reception, into electrical signals for controlling said steering gear, a motor, pinger switch and range reduction cams driven in timed relation by said motor, a pinger switch and a range reduction switch intermittently closed by said respective cams, a pitch controlled switch adapted to close only responsive to pitching of the torpedo beyond a predetermined angle, means under the control of said pinger switch for energizing said transmitter during regularly spaced transmission times separated by listening intervals, and a receiver blanking circuit adapted, upon closing, to disable said receiver, said circuit including said range reduction switch and said pitch controlled switch in series whereby the range of the echo control system is reduced upon excessive pitching of the torpedo.

6. In an echo controlled torpedo equipped with steering gear, a transmitter adapted upon energization to project acoustic signals underwater, control means adapted to energize said transmitter during regularly spaced transmission times separated by listening intervals, said control means including a pinger switch and a motor-driven pinger cam intermittently closing said switch, a receiver adapted to translate echoes of said acoustic signals, upon reception, into electrical signals for controlling said steering gear, and a range reducing circuit adapted on energization to disable said receiver, said circuit including a range reducing switch, a range reducing cam synchronized with said pinger cam and adapted to close said range reducing switch only upon the expiration of a predetermined fraction of each of said listening intervals, and a gravity operated switch adapted to close only responsive to pitching of the torpedo beyond a predetermined angle, said range reducing switch and said gravity operated switch being serially connected in said range reducing circuits so that the range of the echo control system is reduced upon excessive pitching of the torpedo.

References Cited in the file of this patent

UNITED STATES PATENTS

| | | |
|---|---|---|
| 2,409,632 | King | Oct. 22, 1946 |
| 2,442,695 | Koch | June 1, 1948 |